Nov. 9, 1965     P. J. CLIFFORD     3,216,509
DISK HARROW

Filed Oct. 15, 1962     3 Sheets-Sheet 1

INVENTOR.
Peter J. Clifford
BY
Barnard & McGlynn
ATTORNEYS

Nov. 9, 1965 P. J. CLIFFORD 3,216,509
DISK HARROW
Filed Oct. 15, 1962 3 Sheets-Sheet 2
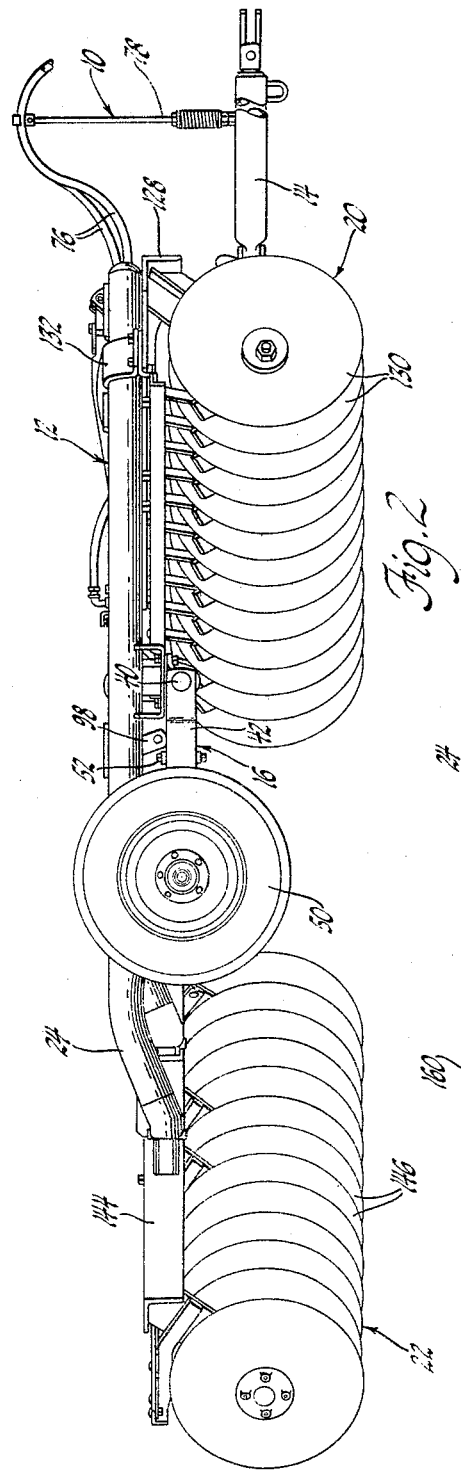
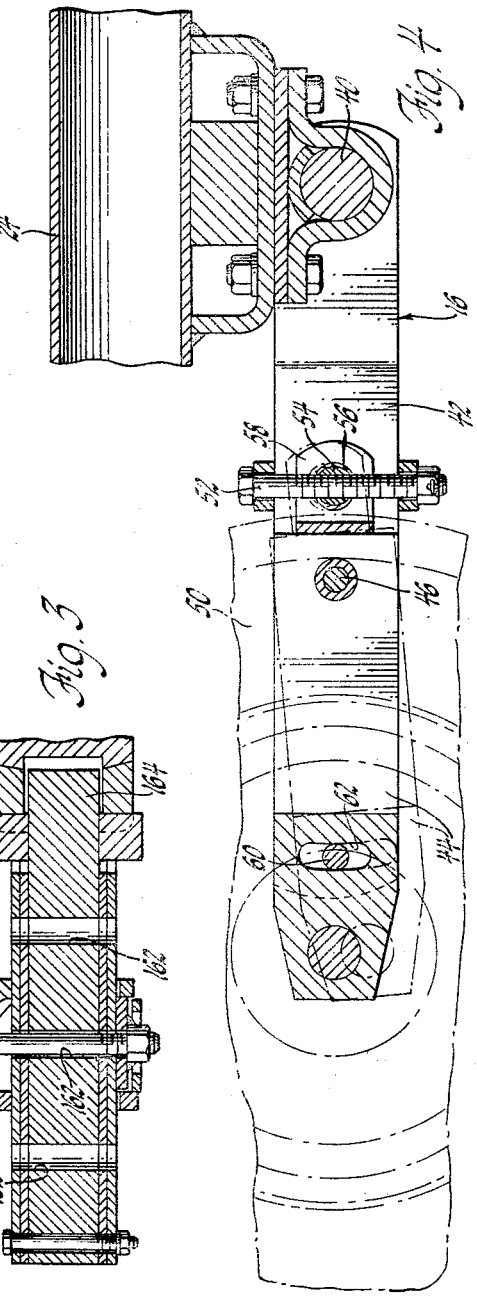
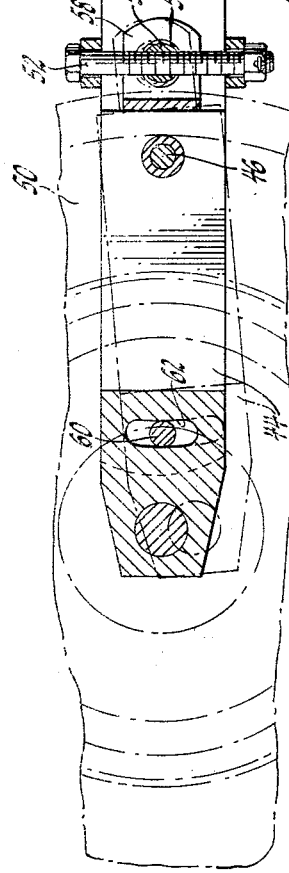
INVENTOR.
Peter J. Clifford
BY
Barnard & McGlynn
ATTORNEYS Nov. 9, 1965  P. J. CLIFFORD  3,216,509
DISK HARROW
Filed Oct. 15, 1962  3 Sheets-Sheet 3

INVENTOR.
Peter J. Clifford
BY
Barnard & McGlynn
ATTORNEYS

United States Patent Office

3,216,509
Patented Nov. 9, 1965

3,216,509
DISK HARROW
Peter J. Clifford, Fresno, Calif., assignor to Massey-Ferguson Inc., Detroit, Mich., a corporation of Maryland
Filed Oct. 15, 1962, Ser. No. 230,452
9 Claims. (Cl. 172—413)

This invention relates to disk harrows and, in particular, to an improved wheel type offset multiple gang disk harrow characterized by improved adjustable suspension means and adjustable disk gangs providing a highly efficient harrowing operation under any one of the wide variety of operating conditions encountered by equipment of this type.

In recent years, wheel type offset multiple gang disk harrows of the type to which the present invention pertains have rapidly gained in popularity, particularly in certain agricultural regions, over other types of disk harrows due, among other things, to the ease with which they can be transported from one working location to another, the ease with which such an implement can be freed should it become bogged down in wet sticky soils, and the fact that disking depth can be accurately controlled, relatively speaking. However, as they gain in popularity, such wheel type disk harrows are being used in an ever increasing variety of locations and terrains for which previously known harrows of this type are not readily or efficiently adaptable.

For example, particularly when a wheeled type disk harrow is to be operated in wet sticky soils in rice growing districts where large amounts of trash are present, it is important that trash clearance at all points on the harrow be taken into consideration and, when such a harrow is to be used in orchard, grove or vineyard areas, the harrow should have a low overall profile and no upwardly protruding parts so as not to catch on overhanging branches. From the suspension standpoint, a leveling mechanism is required and has been provided to maintain the multiple disk gangs substantially level with the ground as the harrow is being towed along a working area or road transported, thereby controlling the disking depth while in a working area and providing sufficient road clearance for the disk gangs during road transport of the harrow. However, leveling mechanisms heretofore proposed are not always capable of accurately controlling disking depth in certain types of working areas such as in disking bedded land. In addition, it is highly desirable to be able to adjust the front and rear disk gangs of such a harrow relative to each other and the harrow carrier frame on which they are mounted such as transverse adjustment of the front disk gang and angling and tilt adjustment of the rear disk gang, in order to adapt the harrow for optimum efficiency of operation under a wide variety of operating conditions. Furthermore, particularly where the wheel suspension means of such a harrow has been power operated as by a hydraulically operated jack of the piston and cylinder type to control movemenut of the harrow carrier frame and the multiple disk gangs mounted thereon between a lowered disking position and a raised road transport position, there is always the danger of a hydraulic system failure during road transport with the obvious undesirable consequences, and the disk gangs must be lowered to the ground when it is desired to remove the jack. Generally speaking, the present invention is directed to a wheeled multiple gang disk harrow of the type aforementioned so constructed and arranged as to be readily adaptable to the wide variety of operating conditions and terrain which it may encounter, while being readily and safely road transportable and efficiently maintained.

Thus, the present invention contemplates a wheeled disk harrow of the type including a carrier frame and front and rear disk gangs mounted in longitudinally spaced relation thereon and extending transversely thereof, and characterized by the fact that the main gang frames of each of the disk gangs are of single beam design and located relative to their disk blades so as to provide optimum trash clearance between the gang beams and disks, while the harrow has an overall low profile with no protruding parts above the carrier frame for smooth flow of branches thereover when working in orchards, groves, vineyards, and the like.

The invention is further characterized by an improved wheel suspension means including a rotatable suspension or lift shaft mounted on the carrier frame, primary suspension arm means secured to the suspension shaft, secondary suspension arm means adjustably mounted on each of the primary suspension arm means for independent adjustment relative thereto and supporting the wheels of the harrow, and power operated means for controlling rotation of the suspension shaft between a transport position engaging the harrow wheels with the ground and lifting the disk gangs out of contact therewith and a disking position engaging the disk gangs with the ground, the suspension means including the independent adjustment of the secondary suspension arm means permitting accurate control of disking depth under a wide variety of operating conditions.

The invention is further characterized by an automatic leveling mechanism including adjustable shock absorbing means connected between the aforementioned suspension means and a hitch or pull box member adapted to be connected to a tractor drawbar so as to absorb shock loads imposed on the harrow and maintain the disk gangs substantially level with the ground irrespective of adjustment of the wheel suspension means, thereby further facilitating accurate control of disking depth and sufficient road clearance for the disk gangs during road transport of the harrow.

In addition, the invention is further characterized by a spring loaded transport latch cooperable between the wheel suspension means and the carrier frame so as to positively lock the suspension means in the aforementioned road transport position completely independent of reliance on the aforementioned power operated suspension control means, while also facilitating maintenance on and replacement of the power unit.

Finally, the invention is further characterized by means respectively mounting the front and rear disk gangs on the carrier frame for adjustment relative thereto and to each other to adapt the harrow further to a wide variety of operating conditions and terrain.

In order to facilitate an understanding of the invention, a preferred embodiment thereof will now be described with reference to the accompanying drawings in which:

FIGURE 2 is a view taken line 2—2 of FIGURE 1;

FIGURE 3 is an enlarged fragmentary sectional view taken on line 3—3 of FIGURE 1 and illustrates certain details of the adjustable mounting of the rear disk gang;

FIGURE 4 is an enlarged fragmentary sectional view taken on line 4—4 of FIGURE 1 and illustrates certain features of the suspension mechanism of the harrow;

Figure 1:
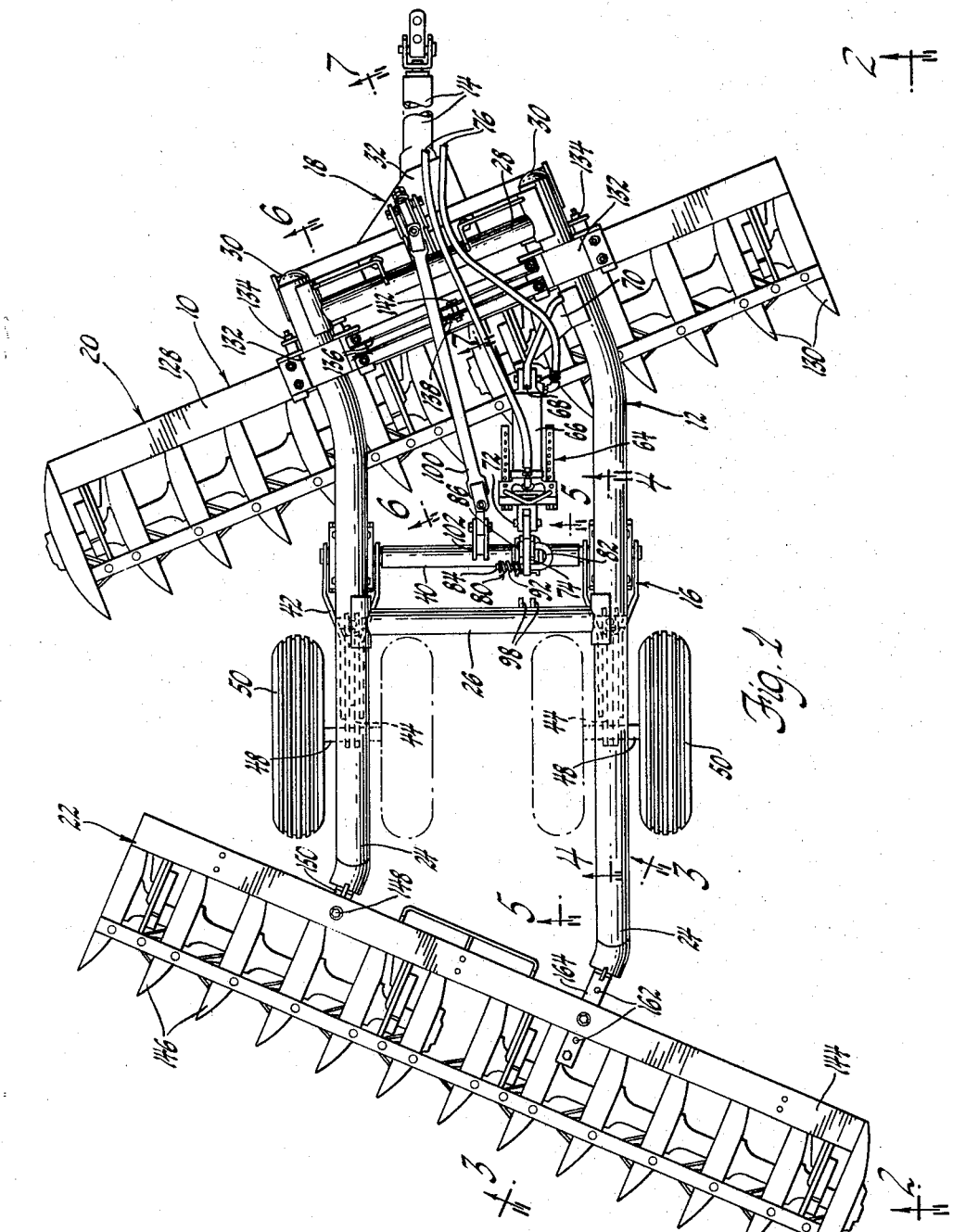
FIGURE 1 is a top plan view of a wheel type multiple gang disk harrow illustrating a preferred embodiment of the invention.

Referring now to the drawings, and particularly FIGURES 1 and 2, there is illustrated a wheel type multiple disk harrow 10 comprising, in general, the carrier frame 12 adapted to be connected as through the drawbar 14 to an agricultural tractor or other suitable prime mover for towing thereof, a wheeled suspension mechanism 16 for the carrier frame, an automatic leveling mechanism 18 operatively interconnecting the suspension mechanism 16 with the drawbar 14 to maintain the disk gangs substantially level with the ground irrespective of the position of the suspension mechanism, and the front and rear disk gangs 20 and 22, respectively, mounted in longitudinally spaced relation on and extending transversely of the carrier frame 12.

More specifically, and referring primarily to FIGURES 1 and 2, it may be seen that the carrier frame 12 comprises a pair of laterally spaced tubular frame members 24 rigidly interconnected by a suitable number of tubular bracing members as indicated at 26 and 28. As will be apparent from FIGURES 1 and 2, the frame members 24 extend substantially parallel to each other and include relatively straight intermediate portions, rearwardly downwardly and somewhat laterally curved portions and laterally curved forward portions providing an extremely low profile for the carrier frame, the forward ends of the frame members 24 being provided with spherically curved caps 30 and there being no upwardly protruding frame parts to provide free flow of branches along the carrier frame.

Figure 7:
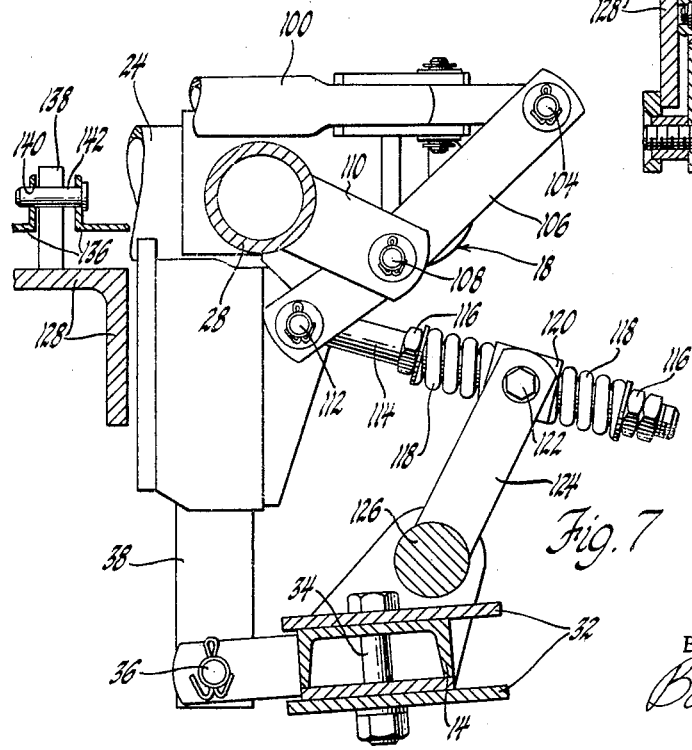
FIGURE 7 is an enlarged fragmentary sectional view taken on line 7—7 of FIGURE 1 and illustrates certain features of the automatic leveling mechanism of the harrow.

Referring in particular to FIGURES 1 and 7, it may be seen that the rearward end of the drawbar 14 is adapted to be connected within a hitch member or pull box 32 as by the pivotal bolt 34, the hitch member in turn being suitably connected as by laterally spaced and aligned substantially horizontal pivot pins 36 to the usual pull posts 38 depending vertically from the front ends of the respective carrier frame members 24. The connection of the drawbar 14 within the hitch member 32 is such as to permit lateral angling of the drawbar relative to the hitch member about pivot bolt 34 while confining these two members for movement vertically together about the axis of pins 36.

Figure 5:
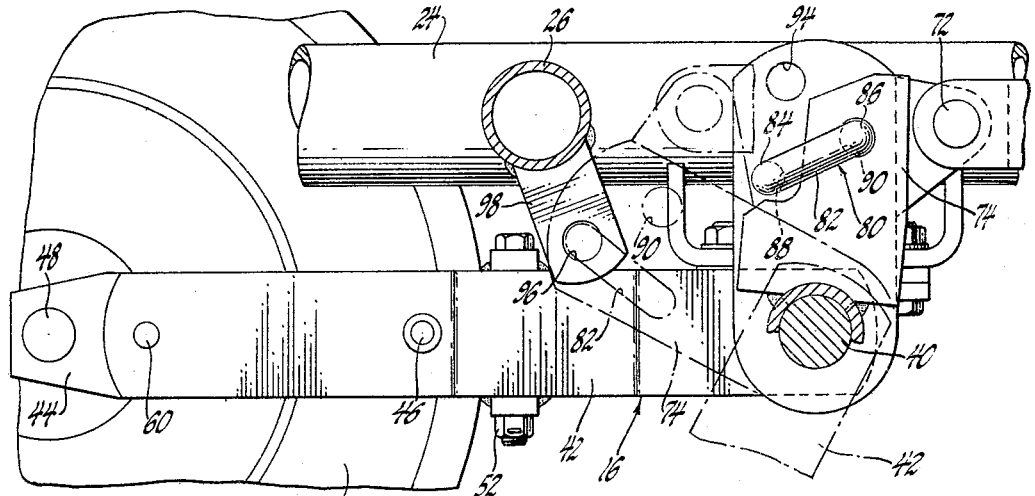
FIGURE 5 is an enlarged fragmentary sectional view taken on line 5—5 of FIGURE 1 and illustrates certain other features of the suspension mechanism of the harrow including the transport latch thereof.
Figure 6:
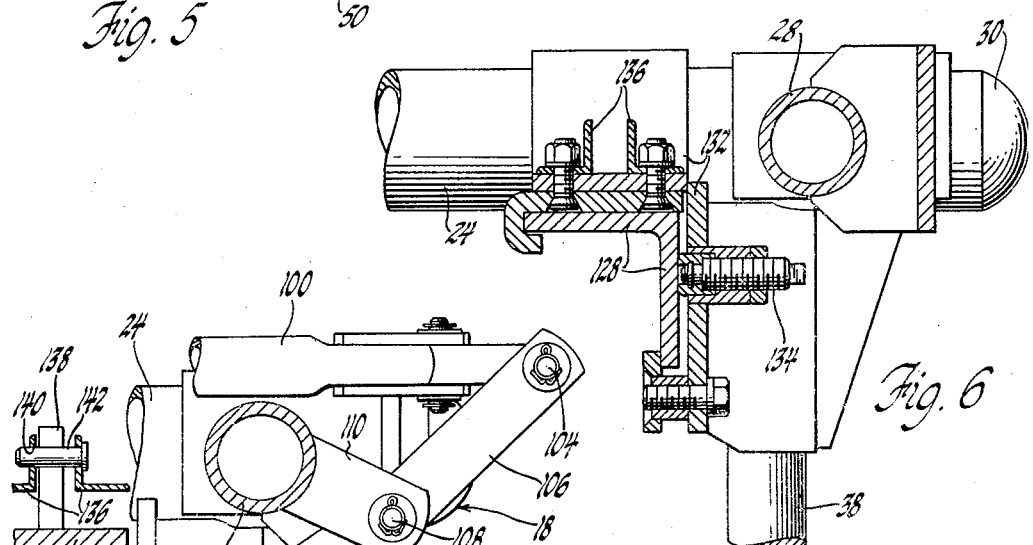
FIGURE 6 is an enlarged fragmentary sectional view taken on line 6—6 of FIGURE 1 and illustrates certain features of the adjustable mounting of the front disk gang.

The suspension mechanism 16, with reference particularly to FIGURES 1, 2, 4 and 5, comprises a suspension or lift shaft 40 extending transversely between and suitably rotatably supported on a substantially horizontal axis on the carrier main frames 24 intermediate the ends of the latter, two pairs of laterally spaced primary suspension arms 42, each pair of which having one end rigidly secured to respective ends of the suspension shaft and extending rearwardly therefrom beneath the respective carrier frames 24 as illustrated in FIGURES 1, 2, 4 and in solid lines in FIGURE 5. A secondary suspension arm 44 has a forward portion thereof pivotally pinned as by pivot bolt 46 between each of the respective pairs of primary suspension arms 42, and each secondary suspension arm extends rearwardly in the aforementioned figures of the drawings beyond the ends of the primary suspension arms and mounts an axle 48 rotatably supporting the ground-engaging wheels 50, the dotted lines in FIGURE 1 merely illustrating that dual wheels may be carried by each suspension arm arrangement as required. A manually adjustable bolt 52 is carried by each of the primary suspension arms and threadably engages a nut 54 loosely confined in an opening 56 in a bracket 58 rigidly secured to the forward end of each of the secondary suspension arms, whereby adjustment of the bolts 52 results in pivotal adjustment of the secondary suspension arms about the axis of the pivot bolt 46 as illustrated in full and solid lines in FIGURE 4 of the drawings, the loose fit of the nut 54 within the bracket 58 preventing any binding between the suspension arms during this adjustment. A clamp and stop bolt 60 extends between rearward portions of each of the primary suspension arms and through an elongate slot 62 in each of the secondary suspension arms to limit vertical adjustment of the secondary suspension arms relative to the primary suspension arms and, hence, the extreme range of relative adjustment of the respective wheels 50, the bolt 60 being adapted to be tightened in position to firmly clamp the secondary suspension arms 44 between and relative to the primary suspension arms 42 after an adjustment is made.

With reference particularly to FIGURES 1, 2 and 5, rotation of the suspension shaft 40 and, hence, movement of the primary suspension arms 42 between the extreme lifted position illustrated in FIGURES 1, 2, 4 and in solid lines in FIGURE 5 and the extreme lowered road transport position illustrated by dotted lines in FIGURE 5 is accomplished by a power operated suspension control means 64 comprising a conventional double-acting hydraulic jack 66 of the piston and cylinder type having the cylinder element thereof pivotally pinned at 68 to a bracket 70 rigidly secured to one of the carrier main frames 24, and the rod of its piston element pivotally pinned at 72 to a lever arm 74 rigidly secured to the suspension shaft 40. Thus, extension of the jack 66 results in counterclockwise movement of the primary suspension arms 42 in FIGURES 2, 4 and 5 to lower the wheels 50 into ground-engaging contact and raise the multiple disk gangs 20 and 22 out of contact with the ground to the extent desired, while being operable in reverse to the extreme position illustrated in FIGURE 2 where the harrow is entirely supported by the disk gangs. Hydraulic fluid is supplied to and exhausted from the respective ends of the jack 66 by means of the conduits 76 suitably supported on the drawbar 14 by the member 78 and connected to a suitable source of fluid under pressure normally carried by the tractor or prime mover.

While the jack 66 may be utilized to positively lock the suspension mechanism 16 in any adjusted position between the extreme ranges thereof as aforedescribed, a spring loaded transport latch 80 as illustrated particularly in FIGURES 1 and 5 is provided to positively lock the primary suspension arms 42 in the dotted line or extreme lowered transport position as illustrated in FIGURE 5 to positively hold the suspension in this position against the possibility of an hydraulic failure, and to permit ready removal of the jack 66 for maintenance or replacement purposes and the like.

To this end, the spring loaded transport latch comprises a generally U-shaped latch member 82 having a pair of spaced parallel legs 84 and 86 extending through similarly spaced openings 88 and 90, respectively, in the lever arm 74, the leg 84 being somewhat longer than the leg 86 and mounting thereon in a conventional manner a coiled spring 92 abutting the lever arm 74. With the latch disengaged, as illustrated in solid line in FIGURES 1 and 5, the spring 92 biases the leg 86 into a retained position within its opening 90 in the lever arm 74 while permitting reciprocable movement of the latch member laterally of the lever arm to disengage the leg 86 for rotation to a latching position. The lever arm 74 further includes another opening 94 alignable with apertures 96 carried by a pair of keeper brackets 98 rigidly secured to the bracing member 26 upon operation of the jack 66 to rotate the primary suspension arms 42 and lever arm 74 to the dotted line or road transport position of FIGURE 5. At this time, the latch member 82 is reciprocated as aforementioned to disengage the leg 86 from the opening 90, at which time the latch member is rotated about the axis of the leg 84 and the leg 86 inserted through the aligned openings 94 and 96 also as illustrated in FIGURE 5. Upon release of the latch lever, therefore, the spring 92 positively holds the leg 86 in latching engagement between the lever arm 74 and keeper brackets 98, thereby positively locking the suspension mechanism in a road transport position.

Referring now particularly to FIGURES 1 and 7, it may be seen that the automatic leveling mechanism 18 comprises a relatively long link or rod 100 having one end thereof suitably pivotally, and universally if required, connected to a lever 102 rigidly secured to the suspension shaft 40, and the other end thereof suitably pivotally pinned at 104 on a horizontal axis to the upper end of a bell crank leveling lever 106 pivotally pinned at 108 intermediate its ends to a bracket 110 fixed to the bracing member 28 for oscillation about a substantially horizontal axis. The other end of the leveling lever 106 is pivotally pinned at 112 on a horizontal axis to one end of a link 114 which is threaded to receive spaced jam nut and washer assemblies 116 respectively mounting a pair of shock absorbing and adjusting spring members 118 confining therebetween a sleeve 120 freely slidable on the link 114 and pivotally pinned at 122 to one or more arm members 124 rigidly secured, as by a shaft 126, to the hitch member or pull box 32.

In operation of the leveling mechanism 18, it will be seen that rotation of the suspension or lift shaft 40 in response to operation of the jack 66 to control the position of the disk gangs relative to the ground will result in reciprocable movement in one direction or the other of the link 100, rotation of the bell crank leveling lever 106 and reciprocable movement of link 114, which movement is transmitted through springs 118 and the sleeve 120 to hitch member 32. More specifically, in lowering the wheels 50 into engagement with the ground, the suspension shaft 40 will be rotated counterclockwise in FIGURE 2 resulting in elevation of the carrier frame 12 and hitch member 32 relative to the ground and the prime mover to which the drawbar 14 is attached. At the same time, however, the leveling mechanism acts to rotate the hitch member 32 clockwise in FIGURE 7 about its horizontal pivotal connection 36 to the carrier frame to, in effect, increase the vertical angle between the hitch member and the pull posts 38, thereby maintaining the disk gangs level during adjustment of the suspension. Naturally, the leveling mechanism acts just in reverse when raising the wheels 50 relative to the carrier frame. In any position of adjustment of the suspension mechanism relative to the carrier frame, it will be noted that any shock loads imposed between the suspension mechanism or carrier frame and the hitch member 32 will be absorbed by the springs 118. Furthermore, the jam nut and washer assemblies 116 may be adjusted to adjust the preload on the shock absorbing springs 118, and also to permit initial adjustment of the angular relationship of the hitch member 32 relative to the pull posts 38 and the suspension mechanism to insure leveling of the harrow.

At this juncture, and while obvious, perhaps it should be noted that ordinarily the suspension mechanism 16 and particularly the wheels thereof will not be disposed in the extreme raised position illustrated particularly in FIGURE 2; that is, while disk harrowing, the suspension mechanism will ordinarily be adjusted in the manner aforedescribed to engage the wheels 50 with the ground to an extent giving the desired disking depth and, by adjusting the suspension mechanism, such disking depth can be accurately controlled and varied.

To briefly summarize the operation of the harrow so far described, it will be seen that the jack 66 may be operated either alone or in conjunction with the adjusting bolts 52 for the secondary suspension arms 44 to accurately control relative engagement of the wheels 50 with the ground and, hence, the disking depth of the disk gangs during a harrowing operation, while the transport latch 80 is utilized to lock the primary suspension arm means 42 in a road transport position with the disk gangs completely out of engagement with the ground while transporting the harrow. Whether transporting the harrow or using it in a disking operation, all movement of the suspension mechanism 16 is sensed and transmitted by the leveling mechanism 18 to the hitch member 32 to at all times maintain the disk gangs substantially level with the ground. At all times, shocks imposed between the suspension mechanism or carrier frame 12 and the hitch member 32 are absorbed by the shock absorbing spring members 118 which are adjustable to adjust their preload or to initially adjust the leveling mechanism.

Referring now particularly to FIGURES 1, 2, 6 and 7, it may be seen that the front disk gang 20 comprises a single gang beam 128 substantially L-shaped in cross section and the usual disk blades 130 suitably rotatably supported thereon in a conventional manner below and to the rear of the gang beam. The gang beam 128 is adjustably slidably mounted through support brackets 132 rigidly secured to the forward end of each of the carrier frame members 24, a suitable number of clamp bolts 134 being threadably carried by each of the brackets 132 associated with each carrier frame for releaseable clamping engagement with the gang beam 128 to hold the latter in any selected adjusted position transversely of the carrier frame. In addition, a pair of elongate closely spaced bracket members 136 extend between and are rigidly secured to the support brackets 132 so as to receive therebetween an upstanding tongue 138 fixedly secured to a portion of the gang beam 128 as illustrated particularly in FIGURE 7. Each of the bracket members 136 includes rows of cooperating aligned apertures 140 adapted to removably receive one, and preferably two pins 142, which cooperate with the tongue 138 to provide a positive stop and additional lock for the gang beam 128 relative to the carrier frame.

Thus, when it is desired to shift the disk gang 20 laterally of the carrier frame, the clamp bolts 134 are released and one of the stop pins 142 is inserted between the bracket members 136 in the position in which it is desired to stop lateral movement of the disk gang relative to the carrier frame. Depending upon in which lateral direction it is desired to adjust the disk gang, the tractor or prime mover is either moved forward or backward causing the reaction of the ground against the disk blades 130 to shift the disk gang laterally until such time as the tongue 138 engages the stop pin 142. At this time, the second stop or lock pin 142, if desired, may be inserted through the bracket members 136 on the side of the tongue opposite the surface thereof engaged with the other stop pin to hold the disk gang transversely of the carrier frame, while the clamp bolts 134 are also tightened down to firmly clamp the gang beam 128.

With particular reference to FIGURES 1 to 3, the rear disk gang 22 is quite similar to the front disk gang in comprising a single gang beam 144 generally L-shaped in cross section and suitably rotatably mounting in a conventional manner a plurality of the disk blades 146 to the rear and below the gang beam. One lateral portion of the gang beam 144 is pivotally pinned as by a bolt 148 to a mounting member 150 carried by and extending from the rearward end of one of the main carrier frames 24, while another lateral portion of the gang beam is adapted to be selectively pinned as by bolt 160 in any one of a plurality of openings 162, herein shown to be three in number, in another mounting member 164 extending from the rearward end of the other main carrier frame 24, and otherwise similar to mounting member 150. Thus, the rear gang 22 may be adjustably angled horizontally relative to the carrier frame 12 and the front disk gang 20 merely by removing the bolt 160 and driving the carrier frame forward or backward as desired to align a selected opening 162 with the opening in gang beam 144 and reinserting the bolt 160 therethrough.

The mounting member 164 further includes a plurality of shim members 166 including apertures alignable with the openings 162. With equal numbers of shims on the upper and lower surfaces of the mounting member 164 as illustrated in FIGURE 3, the gang beam 144 is disposed substantially horizontal. However, to tilt the rear gang 22 within a substantially vertical plane, the bolt 160 may be removed and one or more of the shim members 166 installed on one surface of the mounting member 164 may be associated with the shim members on the opposite surface thereof and the bolt 160 reinserted.

Thus, the front and rear disk gangs 20 and 22 may be adjusted laterally, angularly and tiltably relative to each other and the carrier frame 12 for optimum efficiency while working under a wide variety of operating conditions.

The embodiments of the invention in which an exclusive property or privilege is claimed are defined as follows:

1. In a disk harrow of the type including a carrier frame and a disk gang mounted thereon; the improvement comprising suspension means including a pair of laterally spaced primary suspension arm means adjustably pivotally mounted on said carrier frame for adjustment in a plane substantially parallel to the direction of travel of said carrier frame, a pair of secondary suspension arm means respectively pivotally mounted on said primary suspension arm means for adjustment relative thereto in a plane substantially parallel to the direction of travel of said carrier frame, ground-engaging wheel means rotatably supported on said respective secondary suspension arm means, and adjustable means cooperable between said respective primary and secondary suspension arm means to selectively pivotally adjust them relative to each other.

2. In a disk harrow of the type including a carrier frame and a disk gang mounted thereon; the improvement comprising suspension means including a suspension shaft rotatably adjustably mounted on and extending transversely of said carrier frame, a pair of laterally spaced primary suspension arm means respectively rigidly secured to said suspension shaft for adjustment in a plane substantially parallel to the direction of travel of said carrier frame, a pair of secondary suspension arm means respectively pivotally mounted on said primary suspension arm means for adjustment relative thereto in a plane substantially parallel to the direction of travel of said carrier frame, ground-engaging wheel means rotatably supported on said respective secondary suspension arm means, and adjustable means cooperable between said respective primary and secondary suspension arm means to selectively pivotally adjust them relative to each other.

3. The disk harrow according to claim 2 further comprising means for locking said respective primary and secondary suspension arm means in any selected relative adjusted position.

4. The disk harrow according to claim 2 further comprising cooperable stop means carried by said respective primary and secondary suspension arm means to limit relative pivotal adjustment thereof.

5. The disk harrow according to claim 2 in which said adjustable means comprises a threaded nut member carried by each of said secondary suspension arm means remote from the pivot axis of the latter, and a threaded member carried by each of said primary suspension arm means and threadably engaged with said respective nut members whereby rotation of said threaded members pivotally adjusts said primary and secondary suspension arm means relative to each, and further comprising cooperable stop means carried by said respective primary and secondary suspension arm means remote from the pivotal connection of the latter to limit relative pivotal adjustment thereof.

6. The disk harrow according to claim 2 further comprising means for locking said respective primary and secondary suspension arm means in any selected relative adjusted position, cooperable stop means carried by said respective primary and secondary suspension arm means to limit relative pivotal adjustment thereof, and suspension control means connected to said suspension shaft to rotate the latter between a transport position engaging said wheel means with the ground and lifting said disk gang out of contact therewith and a disking position engaging said disk gang with the ground.

7. In a disk harrow of the type including a carrier frame and a disk gang mounted thereon; the improvement comprising suspension means including a pair of laterally spaced primary suspension arm means adjustably pivotally mounted on said carrier frame, a pair of secondary suspension arm means respectively pivotally mounted on said primary suspension arm means, ground-engaging wheel means rotatably supported on said respective secondary suspension arm means, suspension control means connected to said suspension means to move the latter between a transport position engaging said wheel means with the ground and lifting said disk gang out of contact therewith and a disking position engaging said disk gang with the ground, hitch means pivotally mounted on said carrier frame for movement about a substantially horizontal axis, automatic leveling means interconnecting said suspension means and said hitch means to pivotally adjust the latter about its axis in response to operation of said suspension control means to move said suspension means between said positions thereof, and adjustable means cooperable between said respective primary and secondary suspension arm means to selectively pivotally adjust them relative to each other independently of said suspension control means and said automatic leveling means.

8. In a disk harrow of the type including a carrier frame and a disk gang mounted thereon; the improvement comprising suspension means including a suspension shaft rotatably adjustably mounted on and extending transversely of said carrier frame, a pair of laterally spaced primary suspension arm means rigidly secured to said suspension shaft, a pair of secondary suspension arm means respectively pivotally mounted on said primary suspension arm means, ground engaging wheel means rotatably supported on said respective secondary suspension arm means, adjustable means cooperable between said respective primary and secondary suspension arm means to selectively pivotally adjust them relative to each other independently of rotation of said suspension shaft, suspension control means operatively connected to said suspension shaft to rotate the latter and adjust said suspension means between a transport position engaging said wheel means with the ground and lifting said disk gang out of contact therewith and a disking position engaging said disk gang with the ground, hitch means pivotally mounted on said carrier frame for movement about a substantially horizontal axis, and automatic leveling means interconnecting said suspension shaft and said hitch means to pivotally adjust the latter about its axis in response to operation of said suspension control means to move said suspension means between said positions thereof.

9. The disk harrow according to claim 8 further comprising transport latch means cooperable between said carrier frame and said suspension shaft to positively lock said suspension means in said transport position thereof independently of said suspension control means.

(References on following page)

References Cited by the Examiner

UNITED STATES PATENTS

| | | | |
|---|---|---|---|
| 2,090,553 | 8/37 | Rubens | 172—421 |
| 2,109,769 | 3/38 | Curtis | 172—581 |
| 2,230,850 | 2/41 | Summerfeld | 172—421 |
| 2,597,121 | 5/52 | McKay et al. | 172—421 XR |
| 2,605,686 | 8/52 | Starr | 172—466 |
| 2,616,348 | 11/52 | Ariens | 172—78 XR |
| 2,673,508 | 3/54 | Richey | 172—491 XR |
| 2,691,930 | 10/54 | Forgy | 172—328 |
| 2,701,993 | 2/55 | Allison | 280—43.23 |
| 2,765,609 | 10/56 | Oehler et al. | 172—466 |
| 2,767,538 | 10/56 | Schleidenhelm | 172—328 XR |
| 2,840,971 | 7/58 | Greeson | 172—328 |
| 2,897,905 | 8/59 | McCleskey | 172—581 |
| 2,939,539 | 6/60 | Kramer | 172—413 XR |
| 2,952,472 | 9/60 | McNeill | 280—43.23 |
| 2,967,574 | 1/61 | Morkoski | 172—328 |
| 2,994,544 | 8/61 | Wolf | 280—43.23 |
| 3,078,930 | 2/63 | Foote | 172—448 XR |
| 3,082,830 | 3/63 | McKay | 172—328 |

ANTONIO F. GUIDA, *Primary Examiner.*

T. GRAHAM CRAVER, *Examiner.*